(12) United States Patent
Long et al.

(10) Patent No.: US 11,256,920 B2
(45) Date of Patent: Feb. 22, 2022

(54) METHOD AND APPARATUS FOR CLASSIFYING VIDEO

(71) Applicant: Beijing Baidu Netcom Science and Technology Co., Ltd., Beijing (CN)

(72) Inventors: Xiang Long, Beijing (CN); Dongliang He, Beijing (CN); Fu Li, Beijing (CN); Zhizhen Chi, Beijing (CN); Zhichao Zhou, Beijing (CN); Xiang Zhao, Beijing (CN); Ping Wang, Beijing (CN); Hao Sun, Beijing (CN); Shilei Wen, Beijing (CN); Errui Ding, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 55 days.

(21) Appl. No.: 16/830,895

(22) Filed: Mar. 26, 2020

(65) Prior Publication Data

US 2021/0019531 A1  Jan. 21, 2021

(30) Foreign Application Priority Data

Jul. 16, 2019 (CN) .......................... 201910640913.2

(51) Int. Cl.
*G06K 9/00* (2006.01)
*G06K 9/62* (2022.01)
*G06N 3/08* (2006.01)

(52) U.S. Cl.
CPC ..... *G06K 9/00718* (2013.01); *G06K 9/00744* (2013.01); *G06K 9/6256* (2013.01); *G06K 9/6292* (2013.01); *G06N 3/08* (2013.01)

(58) Field of Classification Search
None
See application file for complete search history.

(56) References Cited

U.S. PATENT DOCUMENTS

| 2018/0032846 | A1* | 2/2018 | Yang | G06K 9/4604 |
| 2018/0144248 | A1 | 5/2018 | Lu | |
| 2019/0384981 | A1* | 12/2019 | Swaminathan | G06K 9/6256 |

FOREIGN PATENT DOCUMENTS

| CN | 107341462 A | 11/2017 |
| CN | 108829719 A | 11/2018 |
| CN | 109271644 A | 1/2019 |
| CN | 109344288 A | 2/2019 |
| CN | 109359636 A | 2/2019 |

\* cited by examiner

*Primary Examiner* — Leon Flores
(74) *Attorney, Agent, or Firm* — Nixon Peabody LLP

(57) ABSTRACT

A method and an apparatus for classifying a video are provided. The method may include: acquiring a to-be-classified video; extracting a set of multimodal features of the to-be-classified video; inputting the set of multimodal features into a post-fusion model corresponding to each modal respectively, to obtain multimodal category information of the to-be-classified video; and fusing the multimodal category information of the to-be-classified video, to obtain category information of the to-be-classified video. This embodiment improves the accuracy of video classification.

13 Claims, 6 Drawing Sheets

METHOD AND APPARATUS FOR CLASSIFYING VIDEO

CROSS-REFERENCE TO RELATED APPLICATIONS

This application claims priority to Chinese Patent Application No. 201910640913.2, filed on Jul. 16, 2019, titled "Method and Apparatus for Classifying Video," which is hereby incorporated by reference in its entirety.

TECHNICAL FIELD

Embodiments of the present disclosure relate to the field of computer technology, and specifically to a method and apparatus for classifying a video.

BACKGROUND

Video classification means to classify a video into a predefined category by analyzing and understanding video information. Video classification is one of the most basic and most important tasks in computer vision. It plays a key role in a large number of realistic applications, including video-based search, video recommendation, and so on. With the increasing number of digital cameras, smart phones and surveillance cameras, the number of videos has increased sharply. How to effectively and efficiently recognize and understand video content is a serious challenge. At the same time, video classification technology is also an important foundation for a variety of other video technologies, such as video tagging, video retrieval, and video title generation. Improving the accuracy of general video classification can also indirectly improve the effects of other video technologies.

SUMMARY

Embodiments of the present disclosure present a method and apparatus for classifying a video.

In a first aspect, a method and an apparatus for classifying a video are provided. The method includes acquiring a to-be-classified video; extracting a set of multimodal features of the to-be-classified video; inputting the set of multimodal features into post-fusion models corresponding to respective modals, to obtain multimodal category information of the to-be-classified video; and fusing the multimodal category information of the to-be-classified video, to obtain category information of the to-be-classified video.

In some embodiments, the extracting a set of multimodal features of the to-be-classified video includes: inputting the to-be-classified video into convolutional neural networks corresponding to the modals, to obtain the set of multimodal features of the to-be-classified video.

In some embodiments, the post-fusion model includes a plurality of parallel attention modules, a fully connected layer, and an activation function layer, post-fusion models corresponding to different modals have different number of attention modules, and parameters of attention modules of a post-fusion model with a large number of attention modules are shared by a post-fusion model with a small number of attention modules.

In some embodiments, the inputting the set of multimodal features into a post-fusion models corresponding to respective modals, to obtain multimodal category information of the to-be-classified video includes: inputting parallelly, for each modal, a feature set of the modal into a plurality of parallel attention modules of the post-fusion model corresponding to the each modal, to obtain a plurality of first pieces of output information; splicing the plurality of first pieces of output information, to obtain a splicing first piece of output information; and fusing the multimodal category information of the to-be-classified video, to obtain category information of the to-be-classified video.

In some embodiments, the fusing the multimodal category information of the to-be-classified video, to obtain category information of the to-be-classified video includes: inputting the multimodal category information of the to-be-classified video into a multimodal fusion model, to obtain the category information of the to-be-classified video.

In some embodiments, the multimodal fusion model includes a plurality of serial gated recurrent units, a fully connected layer, and an activation function layer.

In some embodiments, the inputting the multimodal category information of the to-be-classified video into a multimodal fusion model, to obtain the category information of the to-be-classified video includes: inputting the multimodal category information of the to-be-classified video into the plurality of serial gated recurrent units of the multimodal fusion model correspondingly in modal sequence, to obtain a second piece of output information; and inputting the second piece of output information into the fully connected layer and the activation function layer of the multimodal fusion model in sequence, to obtain the category information of the to-be-classified video.

In some embodiments, the multimodal fusion model is obtained through following training: initializing a neural architecture search network; executing following training: running the neural architecture search network to determine a network structure, where an output terminal of the network structure is connected to an input terminal of the multimodal fusion model; alternately updating the network structure and parameters of the multimodal fusion model; determining whether a classification accuracy of the multimodal fusion model changes; and determining, in response to determining the classification accuracy of the multimodal fusion model remaining unchanged, training the multimodal fusion model being completed; and continuing executing the training, in response to determining the classification accuracy of the multimodal fusion model changing.

In some embodiments, the running the neural architecture search network to determine a network structure includes: running the neural architecture search network for one time to determine a first network structure; the alternately updating the network structure and parameters of the multimodal fusion model includes: fixing the first network structure, computing a classification loss, and updating the parameters of the multimodal fusion model using back propagation; the running the neural architecture search network to determine a network structure further includes: running the neural architecture search network for a plurality of times, to determine a second network structure; and the alternately updating the network structure and parameters of the multimodal fusion model further includes: fixing the multimodal fusion model, computing a classification loss, and updating parameters of the neural architecture search network using a policy gradient method.

In some embodiments, the neural architecture search network includes a long short-term memory network and a global vector, the long short-term memory network includes a plurality of serial long short-term memory network units, and when running the neural architecture search network, the long short-term memory network units select the modal, the number of attention modules, and the activation function respectively.

In some embodiments, the modal sequence is determined by determining training the neural architecture search network being completed, in response to determining the classification accuracy of the multimodal fusion model remaining unchanged; and running the neural architecture search network to determine the modal sequence selected by the plurality of serial long short-term memory network units.

In a second aspect, an apparatus for classifying a video is provided. The apparatus includes an acquiring unit configured to acquire a to-be-classified video; an extracting unit configured to extract a set of multimodal features of the to-be-classified video; a classifying unit configured to input the set of multimodal features into post-fusion models corresponding to respective modals, to obtain multimodal category information of the to-be-classified video; and a fusing unit configured to fuse the multimodal category information of the to-be-classified video, to obtain category information of the to-be-classified video.

In some embodiments, the extracting unit is further configured to: input the to-be-classified video into convolutional neural networks corresponding to the modals, to obtain the set of multimodal features of the to-be-classified video.

In some embodiments, the post-fusion model includes a plurality of parallel attention modules, a fully connected layer, and an activation function layer, post-fusion models corresponding to different modals have different number of attention modules, and parameters of attention modules of a post-fusion model with a large number of attention modules are shared by a post-fusion model with a small number of attention modules.

In some embodiments, the classifying unit is further configured to: input parallelly, for each modal, a feature set of the modal into a plurality of parallel attention modules of the post-fusion model corresponding to the each modal, to obtain a plurality of first pieces of output information; splicing the plurality of first pieces of output information, to obtain a splicing first piece of output information; and fusing the multimodal category information of the to-be-classified video, to obtain category information of the to-be-classified video.

In some embodiments, the fusing unit is further configured to: input the multimodal category information of the to-be-classified video into a multimodal fusion model, to obtain the category information of the to-be-classified video.

In some embodiments, the multimodal fusion model includes a plurality of serial gated recurrent units, a fully connected layer, and an activation function layer.

In some embodiments, the fusing unit is further configured to: input the multimodal category information of the to-be-classified video into the plurality of serial gated recurrent units of the multimodal fusion model correspondingly in modal sequence, to obtain a second piece of output information; and input the second piece of output information into the fully connected layer and the activation function layer of the multimodal fusion model in sequence, to obtain the category information of the to-be-classified video.

In some embodiments, the multimodal fusion model is obtained through following training: initializing a neural architecture search network; executing following training: running the neural architecture search network to determine a network structure, where an output terminal of the network structure is connected to an input terminal of the multimodal fusion model; alternately updating the network structure and parameters of the multimodal fusion model; determining whether a classification accuracy of the multimodal fusion model changes; and determining, in response to determining the classification accuracy of the multimodal fusion model remaining unchanged, training the multimodal fusion model being completed; and continuing executing the training, in response to determining the classification accuracy of the multimodal fusion model changing.

In some embodiments, the running the neural architecture search network to determine a network structure includes: running the neural architecture search network for one time to determine a first network structure; the alternately updating the network structure and parameters of the multimodal fusion model includes: fixing the first network structure, computing a classification loss, and updating the parameters of the multimodal fusion model using back propagation; the running the neural architecture search network to determine a network structure further includes: running the neural architecture search network for a plurality of times, to determine a second network structure; and the alternately updating the network structure and parameters of the multimodal fusion model further includes: fixing the multimodal fusion model, computing a classification loss, and updating parameters of the neural architecture search network using a policy gradient method.

In some embodiments, the neural architecture search network includes a long short-term memory network and a global vector, the long short-term memory network includes a plurality of serial long short-term memory network units, and when running the neural architecture search network, the long short-term memory network units select the modal, the number of attention modules, and the activation function respectively.

In some embodiments, the modal sequence is determined by determining training the neural architecture search network being completed, in response to determining the classification accuracy of the multimodal fusion model remaining unchanged; and running the neural architecture search network to determine the modal sequence selected by the plurality of serial long short-term memory network units.

In a third aspect, an electronic device is provided according to embodiments of the disclosure. The electronic device includes one or more processors; and a storage apparatus, storing one or more programs, which when executed by the one or more processors, cause the one or more processors to implement the method according to any embodiment in the first aspect.

In a fourth aspect, a computer readable medium is provided according to embodiments of the disclosure. The stores computer program, which executed by a processor, implements the method according to any embodiment in the first aspect.

The method and apparatus for classifying a video provided by some embodiments of the present disclosure first extract a set of multimodal features of an acquired to-be-classified video; then input the set of multimodal features into post-fusion models corresponding to respective modal, to obtain multimodal category information of the to-be-classified video; and finally fuse the multimodal category information of the to-be-classified video, to obtain category information of the to-be-classified video, thereby improving the accuracy of video classification.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described in detail below in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described in detail below with reference to the accompanying drawings and in combination with the embodiments.

Figure 1:
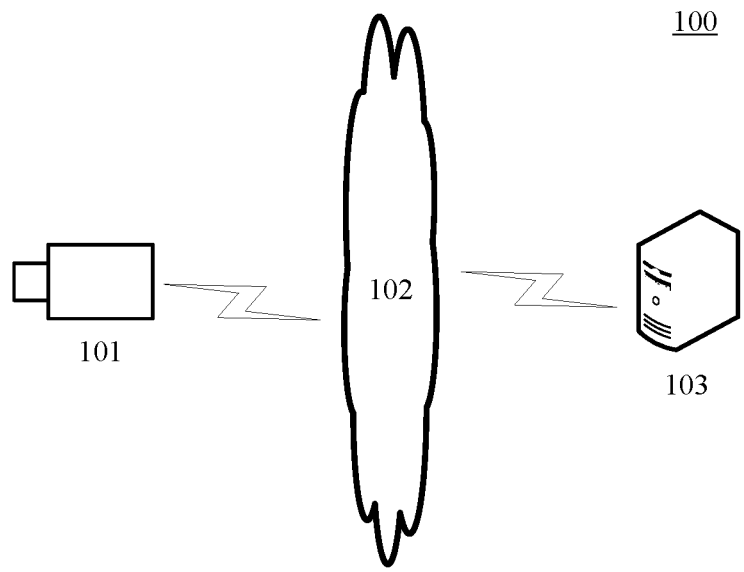
FIG. 1 is an example system architecture in which embodiments of the present disclosure may be implemented.

FIG. 1 shows an example system architecture 100 in which a method for classifying a video or an apparatus for classifying a video of embodiments of present disclosure may be implemented.

As shown in FIG. 1, the system architecture 100 may include a video collecting device 101, a network 102, and a server 103. The network 102 serves as a medium providing a communication link between the video collecting device 101 and the server 103. The network 102 may include various types of connections, such as wired or wireless communication links, or optical cables.

The video collecting device 101 may send a video collected by the video collection device to the server 103 via the network 102. The video collecting device 101 may be hardware, or may be software. When the video collecting device 101 is hardware, the video collecting device may be various electronic devices that support a video collecting function, and include, but are not limited to, a camera, a video camera, a camera, a smart phone, and the like. When the video collecting device 101 is software, the video collecting device may be installed in the above electronic devices, or may be implemented as a plurality of software programs or software modules, or may be implemented as a single software program or software module, which is not specifically limited here.

The server 103 may be a server that provides various services, e.g., a video classification server. The video classification server may process, e.g., analyze, data such as acquired to-be-classified video, and generate a processing result (for example, category information of the to-be-classified video).

It should be noted that the server 103 may be hardware, or may be software. When the server 103 is hardware, the server may be implemented as a distributed server cluster composed of a plurality of servers, or may be implemented as a single server. When the server 103 is software, the server may be implemented as a plurality of software programs or software modules (e.g., software programs or software modules for providing distributed services), or may be implemented as a single software program or software module, which is not specifically limited here.

It should be noted that the method for classifying a video according to some embodiments of the present disclosure is generally executed by the server 103. Accordingly, the apparatus for classifying a video is generally arranged in the server 103.

It should be understood that the numbers of video collecting devices, networks, and servers in FIG. 1 are merely illustrative. Any number of video collecting devices, networks, and servers may be provided based on actual requirements.

Figure 2:
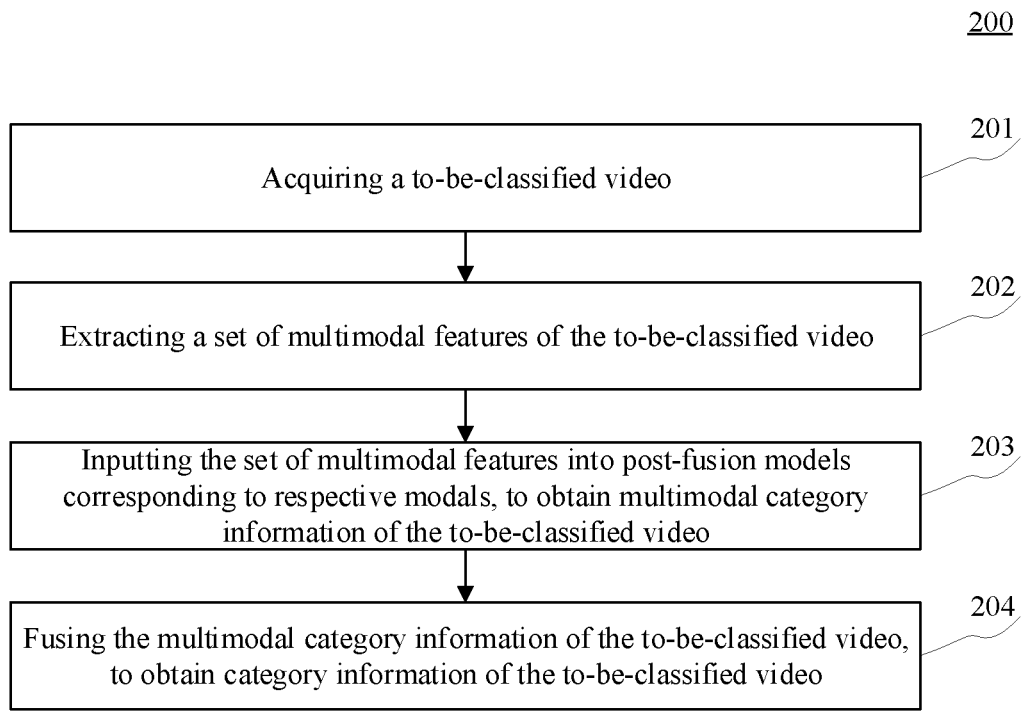
FIG. 2 is a flowchart of a method for classifying a video according to an embodiment of the present disclosure.

Further referring to FIG. 2, a process 200 of a method for classifying a video according to an embodiment of the present disclosure is shown. The method for classifying a video includes the following steps:

Step 201: acquiring a to-be-classified video.

In the present embodiment, an executing body (e.g., the server 103 shown in FIG. 1) of the method for classifying a video may acquire the to-be-classified video from a video collecting device (e.g., the video collecting device 101 shown in FIG. 1). The to-be-classified video may be a video including any content, and the content may include, but is not limited to, actions, activities, events, and the like.

Step 202: extracting a set of multimodal features of the to-be-classified video.

In the present embodiment, the executing body may extract a set of multimodal features of the to-be-classified video. The video may have multimodal features, including but not limited to RGB features, optical flow features, audio features, and so on.

In some alternative implementations of the present embodiment, the executing body may perform color-histogram-based feature extraction on the to-be-classified video, to obtain a RGB feature set of the to-be-classified video; the executing body may further perform optical-flow-based feature extraction on the to-be-classified video, to obtain an optical flow feature set of the to-be-classified video; and at the same time, the executing body may further perform feature extraction on audio in the to-be-classified video, to obtain an audio feature set of the to-be-classified video.

In some alternative implementations of the present embodiment, the executing body may input the to-be-classified video into a convolutional neural network corresponding to each modal, to obtain the set of multimodal features of the to-be-classified video. The convolutional neural network corresponding to each modal may be used for extracting a feature set of each modal, and is obtained by supervised training of an existing convolutional neural network using various machine learning methods and training samples.

Step 203: inputting the set of multimodal features into post-fusion models corresponding to respective modals, to obtain multimodal category information of the to-be-classified video.

In the present embodiment, the executing body may input the set of multimodal features into the post-fusion models corresponding to respective modals, to obtain the multimodal category information of the to-be-classified video. The post-fusion model corresponding to each modal can be used for classifying the video based on the feature set of each modal, and is obtained by supervised training of an existing video classification model using various machine learning methods and training samples.

Step 204: fusing the multimodal category information of the to-be-classified video, to obtain category information of the to-be-classified video.

In the present embodiment, the executing body may fuse the multimodal category information of the to-be-classified video, to obtain the category information of the to-be-classified video.

In some alternative implementations of the present embodiment, the executing body may select category information of a modal from the multimodal category information of the to-be-classified video, for use as the category information of the to-be-classified video.

In some alternative implementations of the present embodiment, the executing body may perform weighted operation on the multimodal category information of the to-be-classified video, and determine the category information of the to-be-classified video based on an operation result.

In some alternative implementations of the present embodiment, the executing body may input the multimodal category information of the to-be-classified video into a multimodal fusion model, to obtain the category information of the to-be-classified video. The multimodal fusion model may be used for classifying the video based on the multimodal category information, and is obtained by supervised training of an existing recurrent neural network using various machine learning methods and training samples.

The method for classifying a video provided by some embodiments of the present disclosure first extracts a set of multimodal features of an acquired to-be-classified video; then inputs the set of multimodal features into post-fusion models corresponding to respective modals, to obtain multimodal category information of the to-be-classified video; and finally fuses the multimodal category information of the to-be-classified video, to obtain category information of the to-be-classified video, thereby improving the accuracy of video classification.

Figure 3:
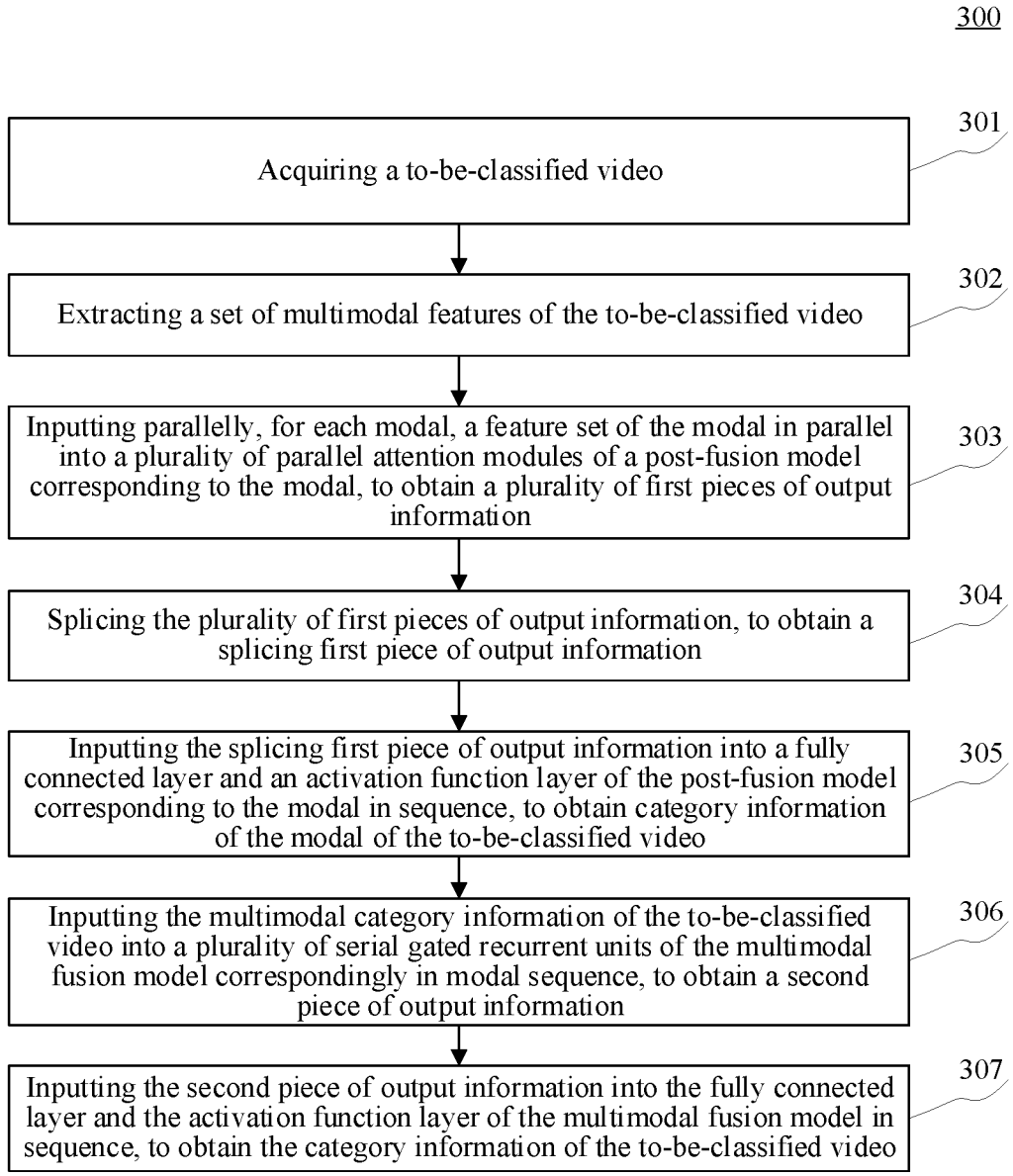
FIG. 3 is a flowchart of the method for classifying a video according to another embodiment of the present disclosure.

Further referring to FIG. 3, a process 300 of the method for classifying a video according to another embodiment of the present disclosure is shown.

In the present embodiment, the post-fusion model may adopt an attention cluster model. Introduction of different attention clusters of different modals can better capture a combination relationship between features.

Specifically, the post-fusion model may include a plurality of parallel attention modules, a fully connected layer, and an activation function layer. An output terminal of the plurality of parallel attention modules is connected to an input terminal of the fully connected layer, and an output terminal of the fully connected layer is connected to an input terminal of the activation function layer. Generally, post-fusion models corresponding to different modals may have different numbers of attention modules. In addition, parameters of attention modules of a post-fusion model with a large number of attention modules may be shared by a post-fusion model with a small number of attention modules. Fully connected layers of the post-fusion models with different numbers of attention modules have different input dimensions. In addition, activation function layers of the post-fusion models corresponding to different modals may also have different activation functions. The activation function of the activation function layer may be, for example, any one of linear, sigmoid, tank, or relu function.

In practice, the number of attention modules is an important hyperparameter of the post-fusion model. Because parameters of the attention modules are shared, it is not necessary to train the parameters of the attention modules for each hyperparameter. Generally, it is only necessary to train parameters of attention modules of a post-fusion model with a largest number of attention modules, and other post-fusion models can correspondingly employ parameters of a part of attention modules of the post-fusion model with the largest number of attention modules. Because the fully connected layers of the post-fusion models with different numbers of attention modules have different input dimensions, parameters of the fully connected layer are mutually independent. Therefore, the parameters of the fully connected layer need to be trained for each hyperparameter.

Figure 4:
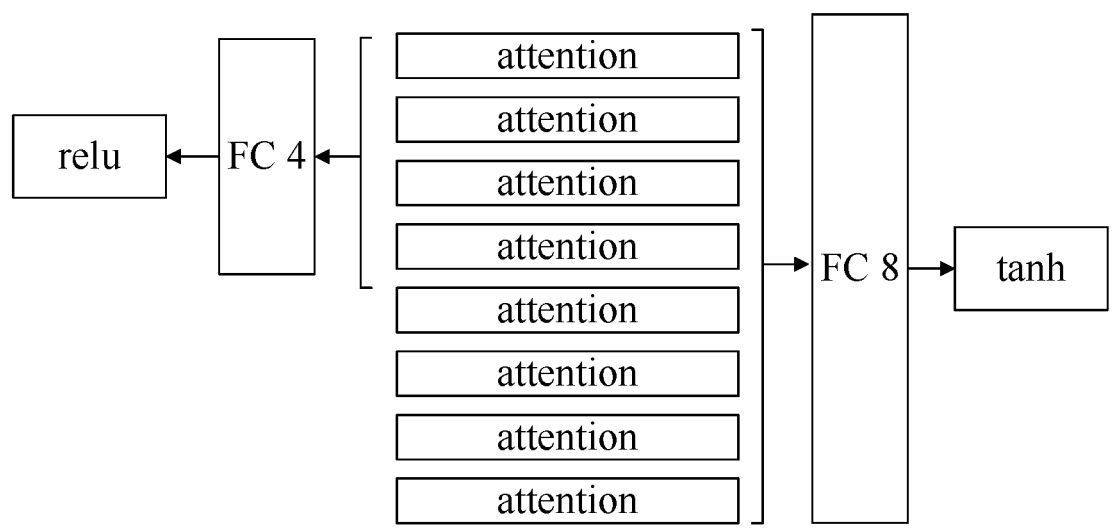
FIG. 4 is a schematic structural diagram of a post-fusion model.

FIG. 4 shows a schematic structural diagram of a post-fusion model. Taking a post-fusion model with 4 attention modules and a post-fusion model with 8 attention modules as an example, the post-fusion model with 4 attention modules is in a left part of FIG. 4, and the post-fusion model with 8 attention modules is in a right part of FIG. 4. In FIG. 4, a block annotated with "attention" represents an attention module. A block annotated with "FC 4" represents a fully connected layer of the post-fusion model with 4 attention modules. A block annotated with "relu" represents the activation function layer of the post-fusion model with 4 attention modules. A block annotated with "FC 8" represents the fully connected layer of the post-fusion model with 8 attention modules. A block annotated with "tank" represents the activation function layer of the post-fusion model with 4 attention modules. In addition, as can be seen from FIG. 4, parameters of 4 attention modules of the post-fusion model with 4 attention modules are identical to parameters of first 4 attention modules of the post-fusion model with 8 attention modules. That is, the post-fusion model with 4 attention modules and the post-fusion model with 8 attention modules share the parameters of the 4 attention modules. Because the fully connected layer of the post-fusion model with 4 attention modules and the fully connected layer of the post-fusion model with 8 attention modules have different input dimensions, parameters of the fully connected layer of the post-fusion model with 4 attention modules are mutually independent with parameters of the fully connected layer of the post-fusion model with 8 attention modules.

In the present embodiment, the multimodal fusion model may adopt a structure based on a gated recurrent unit (GRU). Specifically, the multimodal fusion model includes a plurality of serial gated recurrent units, a fully connected layer, and an activation function layer. An output terminal of a last gated recurrent unit of the plurality of serial gated recurrent units is connected to an input terminal of the fully connected layer, and an output terminal of the fully connected layer is connected to an input terminal of the activation function layer. Generally, category information of a modal is inputted into each gated recurrent unit. An activation function of the activation function layer may be, for example, softmax.

Figure 5:
FIG. 5 is a schematic structural diagram of a multimodal fusion model.

FIG. 5 shows a schematic structural diagram of a multimodal fusion model. Taking a multimodal fusion model with 3 gated recurrent units as an example, a block annotated with "GRU" represents a gated recurrent unit. A block annotated with "FC" represents a fully connected layer. A block annotated with "softmax" represents an activation function layer. A block annotated with "score" represents category information of a video outputted by the multimodal fusion model.

In the present embodiment, the method for classifying a video includes the following steps:

Step 301: acquiring a to-be-classified video.

Step 302: extracting a set of multimodal features of the to-be-classified video.

In the present embodiment, specific operations of steps 301-302 have been described in detail in steps 201-202 in the embodiment shown in FIG. 2, which is not repeated here.

Step 303: inputting parallelly, for each modal, a feature set of the modal into a plurality of parallel attention modules of a post-fusion model corresponding to the modal, to obtain a plurality of first pieces of output information.

In the present embodiment, for each modal, an executing body (e.g., the server 103 shown in FIG. 1) of the method for classifying a video may parallelly input the feature set of the modal into the plurality of parallel attention modules of the post-fusion model corresponding to the modal, to obtain the plurality of first pieces of output information. Generally, the feature set of the modal is inputted into each attention module. In addition, each attention module outputs a first piece of output information after processing the feature set of the modal.

Step 304: splicing the plurality of first pieces of output information, to obtain a splicing first piece of output information.

In the present embodiment, the executing body may splice the plurality of first pieces of output information outputted by the plurality of parallel attention modules of the post-fusion model corresponding to the module, to obtain the splicing first piece of output information.

Step 305: inputting the splicing first piece of output information into a fully connected layer and an activation function layer of the post-fusion model corresponding to the modal in sequence, to obtain category information of the modal of the to-be-classified video.

In the present embodiment, the executing body may input the splicing first piece of output information into the fully connected layer and the activation function layer of the post-fusion model corresponding to the modal in sequence, such that the splicing first piece of output information is processed by the fully connected layer and the activation function layer in sequence, to obtain the category information of the modal of the to-be-classified video.

Step 306: inputting the multimodal category information of the to-be-classified video into a plurality of serial gated recurrent units of the multimodal fusion model correspondingly in modal sequence, to obtain a second piece of output information.

In the present embodiment, the executing body may input the multimodal category information of the to-be-classified video into the plurality of serial gated recurrent units of the multimodal fusion model correspondingly in modal sequence, to obtain the second piece of output information. Generally, the category information of one modal is outputted to each gated recurrent unit. The modal sequence may determine the gated recurrent unit of the plurality of serial gated recurrent units to which the category information of each modal is inputted.

Step 307: inputting the second piece of output information into the fully connected layer and the activation function layer of the multimodal fusion model in sequence, to obtain the category information of the to-be-classified video.

In the present embodiment, the executing body may input the second piece of output information into the fully connected layer and the activation function layer of the multimodal fusion model in sequence, such that the second piece of output information is processed by the fully connected layer and the activation function layer in sequence, to obtain the category information of the to-be-classified video.

As can be seen from FIG. 3, compared with the corresponding embodiment of FIG. 2, the process 300 of the method for classifying a video in the present embodiment highlights the step of classifying the video by the post-fusion model, and fusing the multimodal category information by the multimodal fusion model. As such, parameters of the attention modules of the post-fusion model are shared in the solution described in the present embodiment, and the costs of the trained fusion model are saved. At the same time, the multimodal category information is fused using the multimodal fusion model, thereby further improving the accuracy of video classification.

Figure 6:
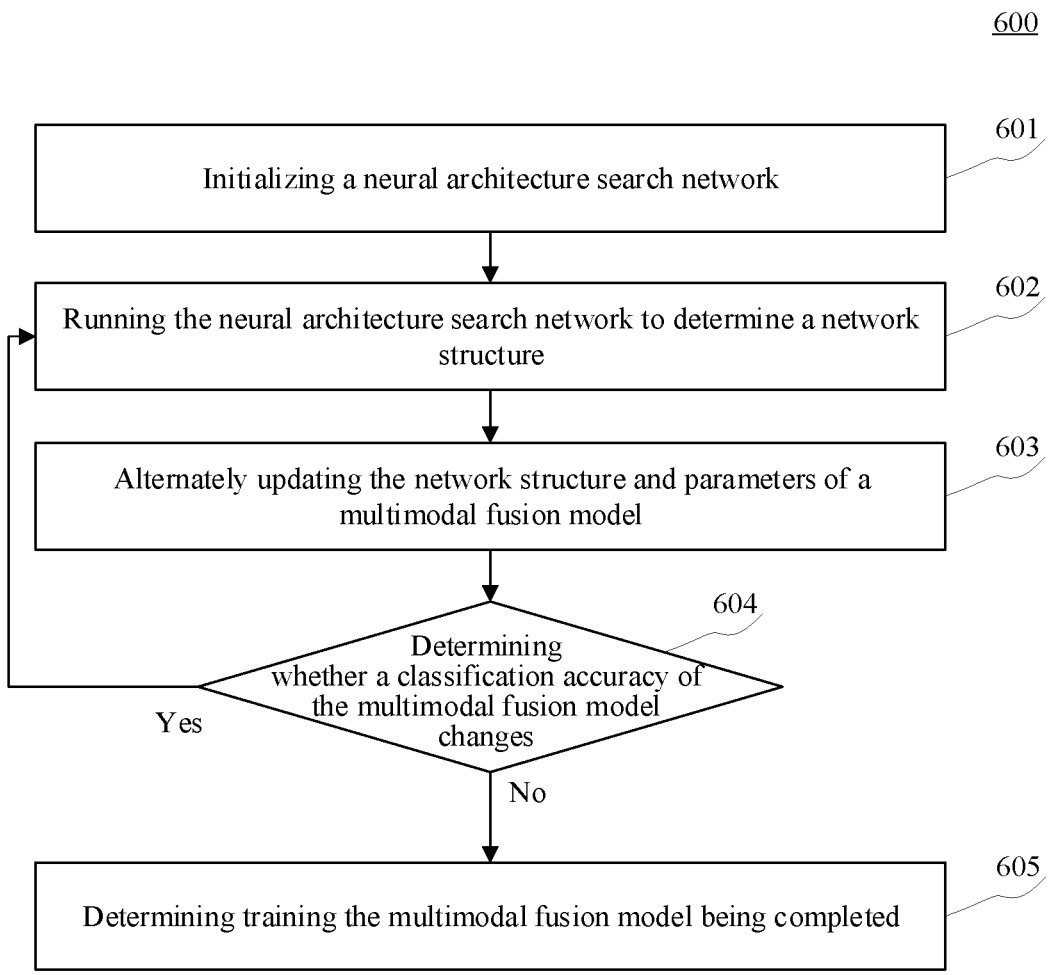
FIG. 6 is a flowchart of a method for training a multimodal fusion model according to an embodiment of the present disclosure.

Further referring to FIG. 6, a process 600 of a method for training a multimodal fusion model according to an embodiment of the present disclosure is shown. The method for training a multimodal fusion model includes the following steps:

In the present embodiment, a framework similar to ENAS (Efficient Neural Architecture Search via Parameter Sharing) is used for automatic search of a neural network.

Specifically, the neural architecture search network may include a long short-term memory (LSTM) and a global vector. The long short-term memory network may include a plurality of serial long short-term memory network units. When running the neural architecture search network, the long short-term memory network units may select the modal, the number of attention modules, and the activation function respectively.

Figure 7:
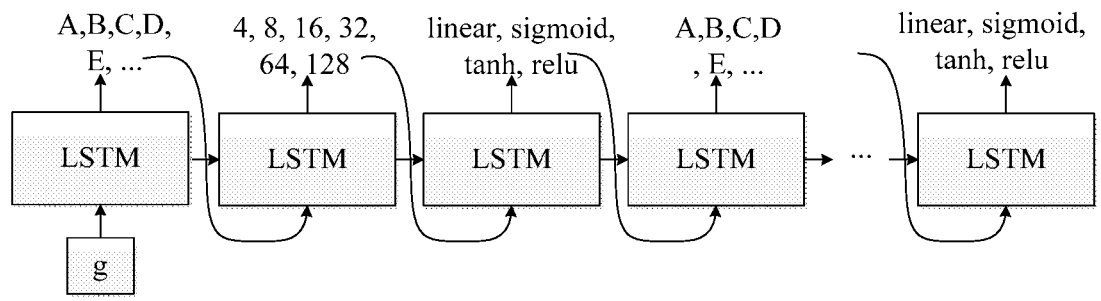
FIG. 7 is a schematic structural diagram of a neural architecture search network.

FIG. 7 shows a schematic structural diagram of a neural architecture search network. A block annotated with "LSTM" represents a long short-term memory network unit. A block annotated with "g" represents a global vector. "A, B, C, D, E, . . . " represent multimodal features. "4, 8, 16, 32, 64, 128" represent a plurality of numbers of attention modules. "Linear, sigmoid, tank, relu" represent a plurality of activation functions. When running the neural architecture search network, a first long short-term memory network unit selects a feature of a modal, a second long short-term memory network unit selects parameters of an attention module, and a third long short-term memory network unit selects an activation function, and the selection is performed circularly in this way. Therefore, when performing feature fusion of N (N is a positive integer) modals, the number of long short-term memory network units is 3N, and 3N steps are performed to select 3N hyperparameters. The neural architecture search network outputs all hyperparameters selected by the long short-term memory network units. The hyperparameters outputted by the neural architecture search network can determine a network structure. An output terminal of the network structure may be connected to an input terminal of the multimodal fusion model.

Figure 8:
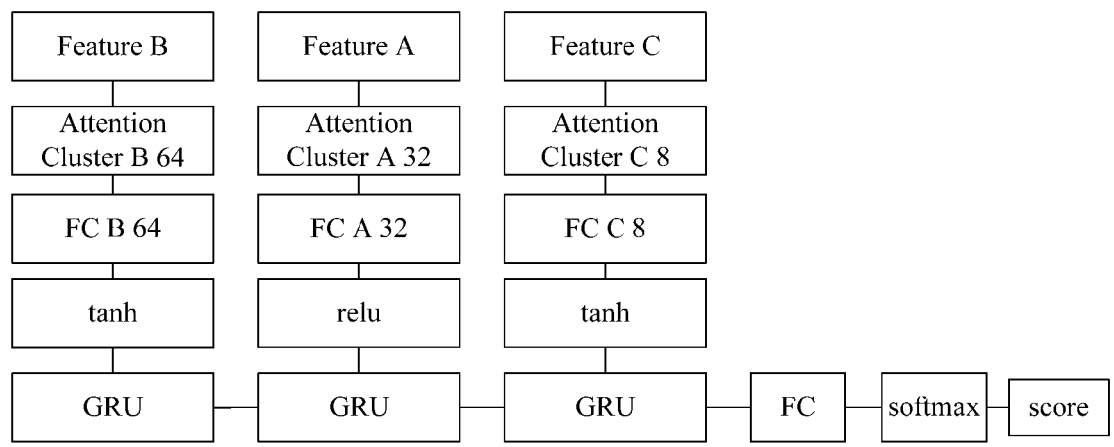
FIG. 8 is a schematic structural diagram of a combination of a network structure and a multimodal fusion model.

FIG. 8 shows a schematic structural diagram of a combination of a network structure and a multimodal fusion model. Taking hyperparameters (B, 64, tan h, A, 32, relu, C, 8, tan h) outputted by the neural architecture search network as an example, an upper part of FIG. 8 shows the network structure, and a lower part of FIG. 8 shows the multimodal fusion model. In FIG. 8, for the network structure, blocks annotated with "Feature B," "Feature A," and "Feature C" represent features of different modals respectively. A block annotated with "Attention Cluster B 64" represents 64 parallel attention modules. A block annotated with "Attention Cluster A 32" represents 32 parallel attention modules. A block annotated with "Attention Cluster C 8" represents 8 parallel attention modules. A block annotated with "FC B 64" represents a fully connected layer with an input dimension of 64. A block annotated with "FC A 32" represents a fully connected layer with an input dimension of 32. A block annotated with "FC C 8" represents a fully connected layer with an input dimension of 8. Blocks annotated with "tan h," and "relu" represent different activation function layers. For a multimodal fusion model, a block annotated with "GRU" represents a gated recurrent unit. A block annotated with "FC" represents a fully connected layer. A block annotated with "softmax" represents an activation function layer. A block annotated with "score" represents category information of a video outputted by the multimodal fusion model.

In the present embodiment, the method for training a multimodal fusion model includes the following steps:

Step 601: initializing a neural architecture search network.

In the present embodiment, an executing body (e.g., the server 103 shown in FIG. 1) of the method for training a multimodal fusion model may initialize a neural architecture search network. Generally, parameters and a global vector of the long short-term memory network in the neural architecture search network are initialized to some different small random numbers.

Step 602: running the neural architecture search network to determine a network structure.

In the present embodiment, the executing body runs the neural architecture search network, and determine the network structure based on hyperparameters outputted by the neural architecture search network. An output terminal of the network structure may be connected to an input terminal of the multimodal fusion model. The parameters of the attention module and the fully connected layer of the network structure may also be pre-initialized.

Step 603: alternately updating the network structure and parameters of the multimodal fusion model.

In the present embodiment, the executing body may alternately update the network structure and the parameters of the multimodal fusion model.

In some alternative implementations of the present embodiment, the executing body may update the network structure and the parameters of the multimodal fusion model through the following steps:

first, running the neural architecture search network for one time to determine a first network structure;

then, fixing the first network structure, computing a classification loss, and updating the parameters of the multimodal fusion model using back propagation;

then, running the neural architecture search network for a plurality of times, to determine a second network structure; and finally, fixing the multimodal fusion model, computing a classification loss, and updating parameters of the neural architecture search network using a policy gradient method.

Generally, one output is obtained by running the neural architecture search network for one time, and a network structure (i.e., the first network structure) is determined based on the output. A plurality of outputs is obtained by running the neural architecture search network for a plurality of times, and a plurality of network structures (i.e., the second network structures) is determined based on the plurality of outputs.

Step 604: determining whether classification accuracy of the multimodal fusion model changes.

In the present embodiment, the executing body may determine whether the classification accuracy of the multimodal fusion model changes. If the classification accuracy of the multimodal fusion model remains unchanged, step 605 is executed; and if the classification accuracy of the multimodal fusion model changes, then training the multimodal fusion model has not been completed yet, and the method is returned to execute step 602.

Step 605: determining training the multimodal fusion model being completed.

In the present embodiment, the training the multimodal fusion model being completed is determined, in the case where the classification accuracy of the multimodal fusion model remains unchanged.

In some alternative implementations of the present embodiment, the executing body can determine the training the neural architecture search network being completed, in the case where the classification accuracy of the multimodal fusion model remains unchanged. In this case, by running the neural architecture search network, a modal sequence selected by a plurality of serial long short-term memory network units can be determined based on a sequence of features in the output. In general, the sequence of the features in the output is consistent with the modal sequence.

Figure 9:
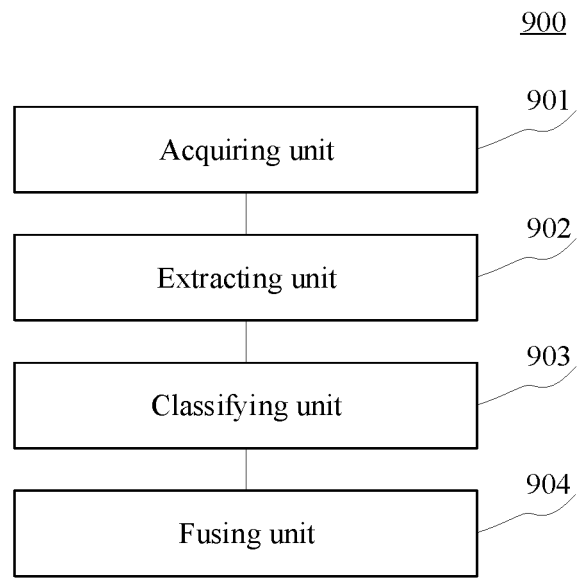
FIG. 9 is a schematic structural diagram of an apparatus for classifying a video according to an embodiment of the present disclosure.

Further referring to FIG. 9, as an implementation of the method shown in the above figures, an embodiment of the present disclosure provides an apparatus for classifying a video. The embodiment of the apparatus corresponds to the embodiment of the method shown in FIG. 2, and the apparatus may be specifically applied to various electronic devices.

As shown in FIG. 9, the apparatus 900 for classifying a video of the present embodiment may include: an acquiring unit 901, an extracting unit 902, a classifying unit 903, and a fusing unit 904. The acquiring unit 901 is configured to acquire a to-be-classified video; the extracting unit 902 is configured to extract a set of multimodal features of the to-be-classified video; the classifying unit 903 is configured to input the set of multimodal features into post-fusion models corresponding to respective modals, to obtain multimodal category information of the to-be-classified video; and the fusing unit 904 is configured to fuse the multimodal category information of the to-be-classified video, to obtain category information of the to-be-classified video.

The related description of step 201, step 202, step 203, and step 204 in the corresponding embodiment of FIG. 2 may be referred to for specific processing of the acquiring unit 901, the extracting unit 902, the classifying unit 903, and the fusing unit 904 of the apparatus 900 for classifying a video and the technical effects thereof in the present embodiment, respectively, which is not repeated here.

In some alternative implementations of the present embodiment, the extracting unit 902 is further configured to: input the to-be-classified video into convolutional neural networks corresponding to modals, to obtain the set of multimodal features of the to-be-classified video.

In some alternative implementations of the present embodiment, the post-fusion model includes a plurality of parallel attention modules, a fully connected layer, and an activation function layer, post-fusion models corresponding to different modals have different number of attention modules, and parameters of attention modules of a post-fusion model with a large number of attention modules are shared by a post-fusion model with a small number of attention modules.

In some alternative implementations of the present embodiment, the classifying unit 903 is further configured to: parallelly input, for each modal, a feature set of the modal into a plurality of parallel attention modules of the post-fusion model corresponding to the modal, to obtain a plurality of first pieces of output information; splice the plurality of first pieces of output information, to obtain a splicing first piece of output information; and input the splicing first piece of output information into the fully connected layer and the activation function layer of the post-fusion model corresponding to the modal in sequence, to obtain category information of the modal of the to-be-classified video.

In some alternative implementations of the present embodiment, the fusing unit 904 is further configured to: input the multimodal category information of the to-be-classified video into a multimodal fusion model, to obtain the category information of the to-be-classified video.

In some alternative implementations of the present embodiment, the multimodal fusion model includes a plurality of serial gated recurrent units, a fully connected layer, and an activation function layer.

In some alternative implementations of the present embodiment, the fusing unit 904 is further configured to: input the multimodal category information of the to-be-classified video into the plurality of serial gated recurrent units of the multimodal fusion model correspondingly in modal sequence, to obtain a second piece of output information; and input the second piece of output information into the fully connected layer and the activation function layer of the multimodal fusion model in sequence, to obtain the category information of the to-be-classified video.

In some alternative implementations of the present embodiment, the multimodal fusion model is obtained through the following training: running the neural architecture search network to determine a network structure, where an output terminal of the network structure is connected to an input terminal of the multimodal fusion model; alternately updating the network structure and parameters of the multimodal fusion model; determining whether classification accuracy of the multimodal fusion model changes; and determining, in response to determining the classification accuracy of the multimodal fusion model remaining unchanged, training the multimodal fusion model being completed; and continuing executing the training, in response to determining the classification accuracy of the multimodal fusion model changing.

In some alternative implementations of the present embodiment, the running the neural architecture search network to determine a network structure includes: running the neural architecture search network for one time to determine a first network structure; the alternately updating the network structure and parameters of the multimodal fusion model includes: fixing the first network structure, computing a classification loss, and updating the parameters of the multimodal fusion model using back propagation; the running the neural architecture search network to determine a network structure further includes: running the neural architecture search network for a plurality of times, to determine a second network structure; and the alternately updating the network structure and parameters of the multimodal fusion model further includes: fixing the multimodal fusion model, computing a classification loss, and updating parameters of the neural architecture search network using a policy gradient method.

In some alternative implementations of the present embodiment, the neural architecture search network includes a long short-term memory network and a global vector, the long short-term memory network includes a plurality of serial long short-term memory network units, and when running the neural architecture search network, long short-term memory network units select the modal, the number of attention modules, and the activation function respectively.

In some alternative implementations of the present embodiment, the modal sequence is determined by: determining training the neural architecture search network being completed, in response to determining the classification accuracy of the multimodal fusion model remaining unchanged; and running the neural architecture search network to determine the modal sequence selected by the plurality of serial long short-term memory network units.

Figure 10:
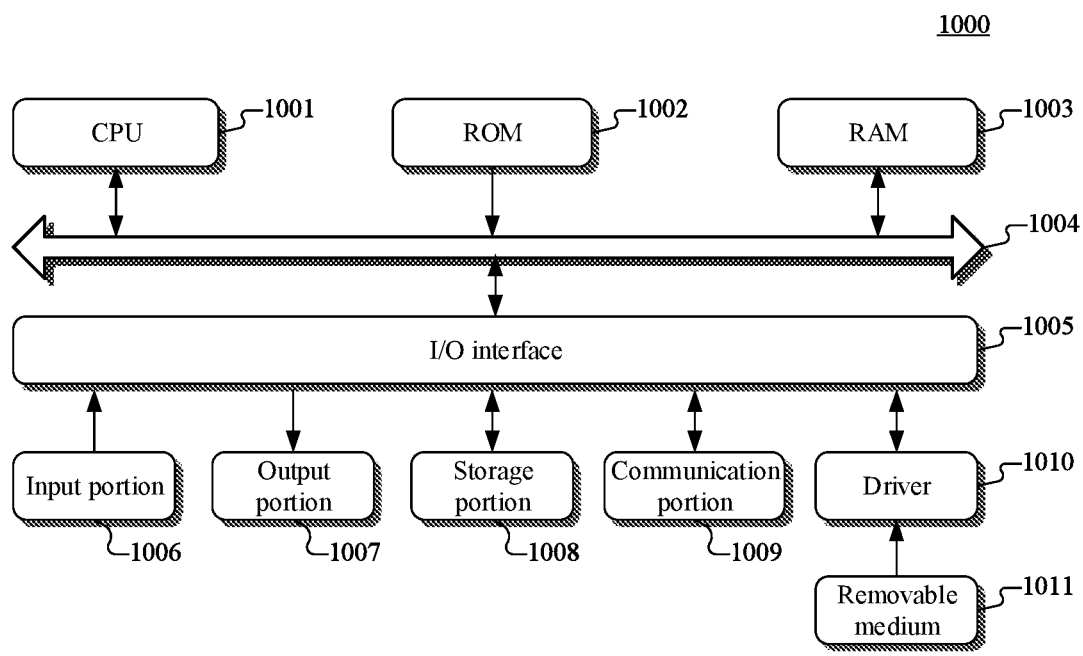
FIG. 10 is a schematic structural diagram of a computer system adapted to implement an electronic device of some embodiments of the present disclosure.

Referring to FIG. 10 below, a schematic structural diagram of a computer system 1000 adapted to implement an electronic device (e.g., the server 103 in FIG. 1) of embodiments of the present disclosure is shown. The electronic device shown in FIG. 10 is merely an example, and should not impose any limitation on the functions and scope of use of some embodiments of the present disclosure.

As shown in FIG. 10, the computer system 1000 includes a central processing unit (CPU) 1001, which may execute various appropriate actions and processes in accordance with a program stored in a read only memory (ROM) 1002 or a program loaded into a random access memory (RAM) 1003 from a storage portion 1008. The RAM 1003 further stores various programs and data required by operations of the system 1000. The CPU 1001, the ROM 1002, and the RAM 1003 are connected to each other through a bus 1004. An input/output (I/O) interface 1005 is also connected to the bus 1004.

The following components are connected to the I/O interface 1005: an input portion 1006 including a keyboard, a mouse, or the like; an output portion 1007 including a cathode ray tube (CRT), a liquid crystal display device (LCD), a speaker, or the like; a storage portion 1008 including a hard disk, or the like; and a communication portion 1009 including a network interface card, such as a LAN card and a modem. The communication portion 1009 performs communication processing via a network, such as the Internet. A driver 1010 is also connected to the I/O interface 1005 as required. A removable medium 1011, such as a magnetic disk, an optical disk, a magneto-optical disk, and a semiconductor memory, may be installed on the driver 1010 as required, such that a computer program read therefrom is installed in the storage portion 1008 as needed.

In particular, according to some embodiments of the present disclosure, the process described above with reference to the flow chart may be implemented in a computer software program. For example, some embodiments of the present disclosure include a computer program product, which includes a computer program that is carried in a computer readable medium. The computer program includes program codes for executing the method as shown in the flow chart. In such an embodiment, the computer program may be downloaded and installed from a network via the communication portion 1009, and/or may be installed from the removable medium 1011. The computer program, when executed by the central processing unit (CPU) 1001, implements the above functions defined by the method of some embodiments of the present disclosure.

It should be noted that the computer readable medium according to the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or electronic device. In the circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including an acquiring unit, an extracting unit, a classifying unit, and a fusing unit. The names of the units do not constitute a limitation to such units themselves in some cases. For example, the acquiring unit may be further described as "a unit configured to acquire a to-be-classified video."

In another aspect, an embodiment of the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire a to-be-classified video; extract a set of multimodal features of the to-be-classified video; input the set of multimodal features into a post-fusion model corresponding to each modal, to obtain multimodal category information of the to-be-classified video; and fuse the multimodal category information of the to-be-classified video, to obtain category information of the to-be-classified video.

The above description only provides explanation of the preferred embodiments and the employed technical principles of the present disclosure. It should be understood by those skilled in the art that the inventive scope involved in the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in the present disclosure.

What is claimed is:
1. A method for classifying a video, comprising:
acquiring a to-be-classified video;
extracting a set of multimodal features of the to-be-classified video;
inputting the set of multimodal features into post-fusion models corresponding to respective modals, to obtain multimodal category information of the to-be-classified video, wherein for the post-fusion models corresponding to respective modals, post-fusion models corresponding to different modals have different number of attention modules, and parameters of attention modules of a post-fusion model with a greater number of attention modules are shared by a post-fusion model with a smaller number of attention modules; and fusing the multimodal category information of the to-be-classified video, to obtain category information of the to-be-classified video.

2. The method according to claim 1, wherein the extracting a set of multimodal features of the to-be-classified video comprises:
inputting the to-be-classified video into convolutional neural networks corresponding to the modals, to obtain the set of multimodal features of the to-be-classified video.

3. The method according to claim 1, wherein a post-fusion model in the post-fusion models corresponding to respective modal comprises a plurality of parallel attention modules, a fully connected layer, and an activation function layer.

4. The method according to claim 3, wherein the inputting the set of multimodal features into post-fusion models corresponding to respective modals, to obtain multimodal category information of the to-be-classified video comprises:
inputting parallelly, for each modal, a feature set of the modal into a plurality of parallel attention modules of the post-fusion model corresponding to the each modal, to obtain a plurality of first pieces of output information;
splicing the plurality of first pieces of output information, to obtain a splicing first piece of output information; and
inputting the splicing first piece of output information into the fully connected layer and the activation function layer of the post-fusion model corresponding to the each modal in sequence, to obtain category information of the each modal of the to-be-classified video.

5. The method according to claim 1, wherein the fusing the multimodal category information of the to-be-classified video, to obtain category information of the to-be-classified video comprises:
inputting the multimodal category information of the to-be-classified video into a multimodal fusion model, to obtain the category information of the to-be-classified video.

6. The method according to claim 5, wherein the multimodal fusion model comprises a plurality of serial gated recurrent units, a fully connected layer, and an activation function layer.

7. The method according to claim 6, wherein the inputting the multimodal category information of the to-be-classified video into a multimodal fusion model, to obtain the category information of the to-be-classified video comprises:
inputting the multimodal category information of the to-be-classified video into the plurality of serial gated recurrent units of the multimodal fusion model correspondingly in modal sequence, to obtain a second piece of output information; and
inputting the second piece of output information into the fully connected layer and the activation function layer of the multimodal fusion model in sequence, to obtain the category information of the to-be-classified video.

8. The method according to claim 5, wherein the multimodal fusion model is obtained through following training:
initializing a neural architecture search network;
executing following training: running the neural architecture search network to determine a network structure, wherein an output terminal of the network structure is connected to an input terminal of the multimodal fusion model; alternately updating the network structure and parameters of the multimodal fusion model; determining whether a classification accuracy of the multimodal fusion model changes; and determining, in response to determining the classification accuracy of the multimodal fusion model remaining unchanged, training the multimodal fusion model being completed; and
continuing executing the training, in response to determining the classification accuracy of the multimodal fusion model changing.

9. The method according to claim 8, wherein the running the neural architecture search network to determine a network structure comprises:
running the neural architecture search network for one time to determine a first network structure;
the alternately updating the network structure and parameters of the multimodal fusion model comprises:
fixing the first network structure, computing a classification loss, and updating the parameters of the multimodal fusion model using back propagation;
the running the neural architecture search network to determine a network structure further comprises:
running the neural architecture search network for a plurality of times, to determine a second network structure; and
the alternately updating the network structure and parameters of the multimodal fusion model further comprises:
fixing the multimodal fusion model, computing a classification loss, and updating parameters of the neural architecture search network using a policy gradient method.

10. The method according to claim 8, wherein the neural architecture search network comprises a long short-term memory network and a global vector, the long short-term memory network comprises a plurality of serial long short-term memory network units, and when running the neural architecture search network, the long short-term memory network units select the modal, the number of attention modules, and the activation function respectively.

11. The method according to claim 10, wherein the modal sequence is determined by:
determining training the neural architecture search network being completed, in response to determining the classification accuracy of the multimodal fusion model remaining unchanged; and
running the neural architecture search network to determine the modal sequence selected by the plurality of serial long short-term memory network units.

12. An apparatus for classifying a video, comprising:
at least one processor; and
a memory storing instructions, wherein the instructions when executed by the at least one processor, cause the at least one processor to perform operations, the operations comprising:
acquiring a to-be-classified video;
extracting a set of multimodal features of the to-be-classified video;
inputting the set of multimodal features into post-fusion models corresponding to respective modals, to obtain multimodal category information of the to-be-classified video, wherein for the post-fusion models corresponding to respective modals, post-fusion models corresponding to different modals have different number of attention modules, and parameters of attention modules of a post-fusion model with a greater number of attention modules are shared by a post-fusion model with a smaller number of attention modules; and
fusing the multimodal category information of the to-be-classified video, to obtain category information of the to-be-classified video.

13. A non-transitory computer readable medium, storing a computer program thereon, wherein the computer program, when executed by a processor, causes the processor to perform operations, the operations comprising:
    acquiring a to-be-classified video;
    extracting a set of multimodal features of the to-be-classified video;
    inputting the set of multimodal features into post-fusion models corresponding to respective modals, to obtain multimodal category information of the to-be-classified video, wherein for the post-fusion models corresponding to respective modals, post-fusion models corresponding to different modals have different number of attention modules, and parameters of attention modules of a post-fusion model with a greater number of attention modules are shared by a post-fusion model with a smaller number of attention modules; and
    fusing the multimodal category information of the to-be-classified video, to obtain category information of the to-be-classified video.

\* \* \* \* \*